H. KUHN.
DEVICE FOR TURNING AND PLANING METALS, WOOD, AND THE LIKE.
APPLICATION FILED APR. 5, 1915.
1,276,081.
Patented Aug. 20, 1918.
2 SHEETS—SHEET 1.
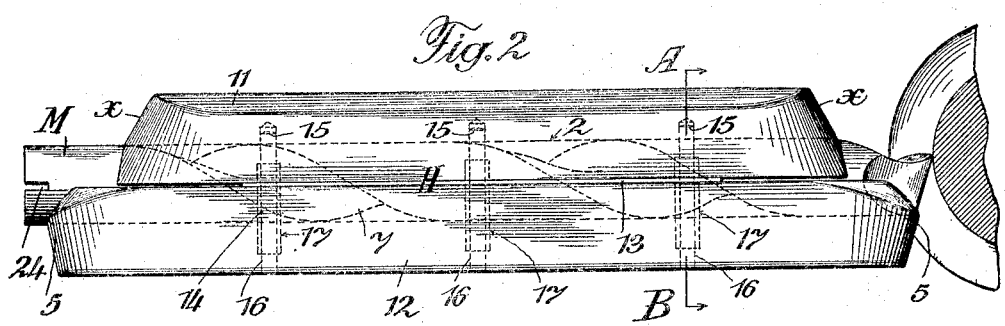
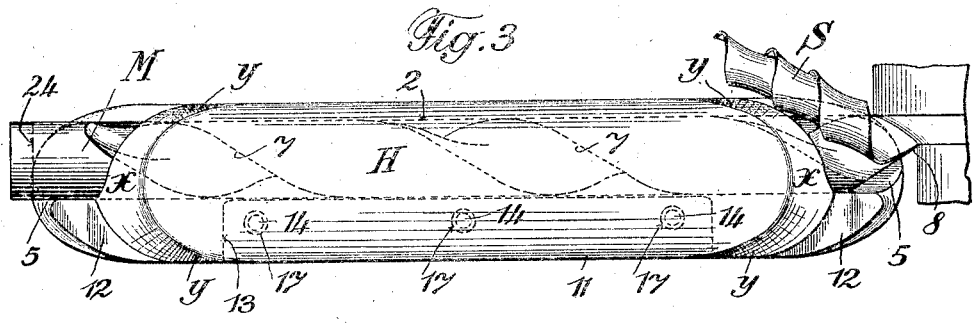
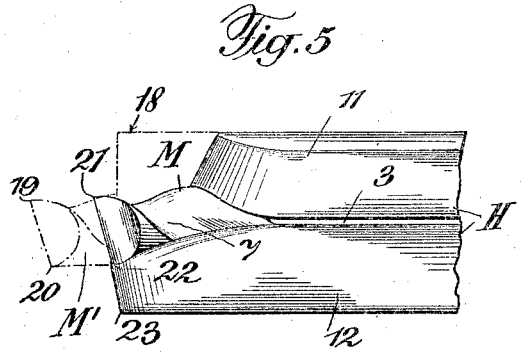
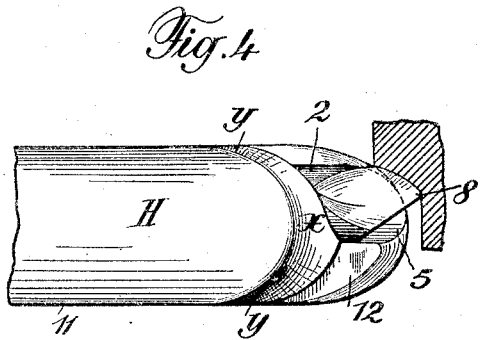
Inventor:
Hermann Kuhn,
By
atty.

H. KUHN.
DEVICE FOR TURNING AND PLANING METALS, WOOD, AND THE LIKE.
APPLICATION FILED APR. 5, 1915.
1,276,081.
Patented Aug. 20, 1918.
2 SHEETS—SHEET 2.
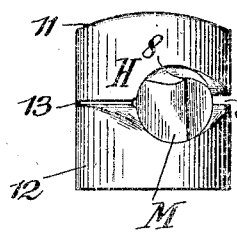
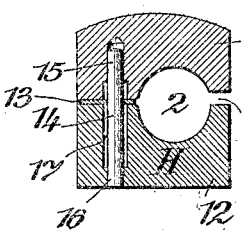
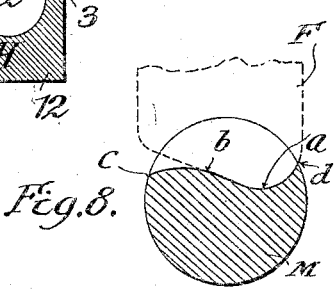
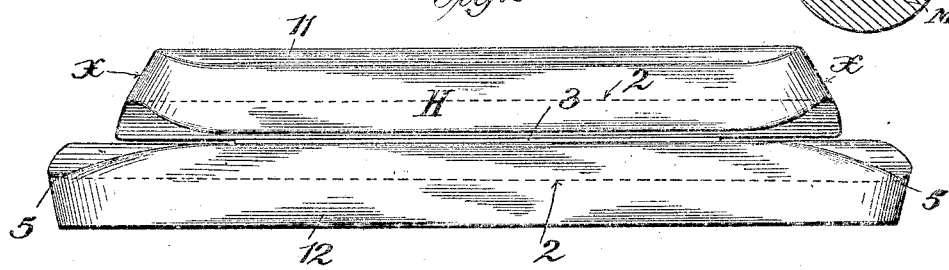
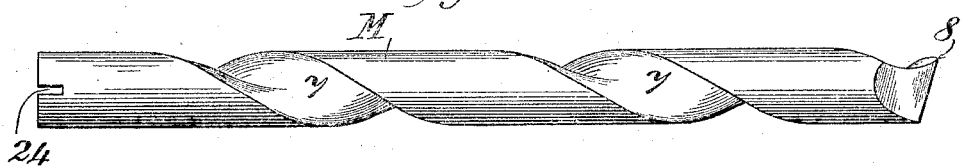
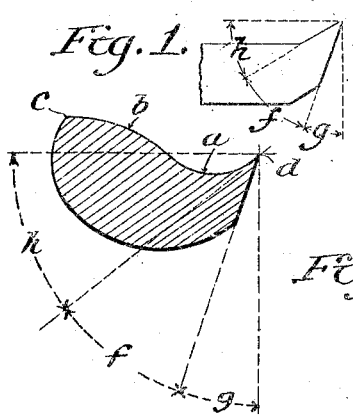
Inventor:
Hermann Kuhn,
By 
Atty.

UNITED STATES PATENT OFFICE.

HERMANN KUHN, OF TURBENTHAL, SWITZERLAND, ASSIGNOR TO THE FIRM OF GEBRÜDER KUHN, OF TURBENTHAL, SWITZERLAND.

DEVICE FOR TURNING AND PLANING METALS, WOOD, AND THE LIKE.

1,276,081.   Specification of Letters Patent.   Patented Aug. 20, 1918.

Application filed April 5, 1915. Serial No. 19,359.

*To all whom it may concern:*

Be it known that I, HERMANN KUHN, a citizen of the Republic of Switzerland, residing at Turbenthal, Canton Zurich, Switzerland, have invented new and useful Improvements in Devices for Turning and Planing Metals, Wood, and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Tools for turning and planing metals, wood and the like are customarily of the "usual type" made from steels of quadrangular cross section.

Such tools have the drawback that when they become worn, they have to be re-forged, re-tempered and re-dressed, as will hereinafter be explained. Such tools when used for heavy duty must also have a large cross-section.

It has been proposed to use a round tool, which after the manner of a twist drill is provided with a spiral groove. The form of the cross section of the spiral groove of such a tool corresponds substantially to the cross-sectional form of the spiral groove of a twist drill.

Owing to the shape of the groove in the known forms of round lathe tools it is necessary to carry out difficult re-dressing operations when the edge has been worn away, in order that the tool may be used again.

Owing to the weakening of the cross section by the spiral groove it was also necessary to choose a very large cross-section if heavy jobs were to be carried out.

It has further been proposed to fit such spiral cutting tools into tool-holders to complement the round cross-section to a square, so that it could be easily clamped. In all cases, however, the spiral cutting tool must project beyond the tool holder for the purpose of enabling it to cut off the material and to make room for the cuttings. The result of this is, that these projecting points frequently break off when heavy cuts are made.

This invention has for its object to provide a new cutting tool in which the hereinbefore mentioned drawbacks are eliminated.

To accomplish this object my invention consists, first, in giving to the spiral groove, with regard to the cross section of the tool, a new shape, which may be produced by means of an eccentrically set milling cutter. The invention further consists in giving to the tool holder a new form, which permits the cutting tool to fit into said holder in such a manner that it scarcely projects beyond the holder, while the holder so coöperates with the tool that it is still able to cut off and remove heavy cuttings.

Other advantages attained by means of these constructions are more fully set forth in the specification.

One mode of carrying the invention into effect is shown, by way of example, in the accompanying drawings, in which—

Figure 1 is an ideal shape of the common type of tool having a quadrangular cross section, serving to explain the various angles of the tool as compared with my invention.

Figs. 2 and 3 are a top and side view, respectively, of the tool and tool holder, showing these parts in operative position.

Fig. 4 is a part top view, in which the projecting tool end is wholly visible.

Fig. 5 is a side view of the front end of the device seen from the side opposite to that shown in Fig. 2.

Fig. 6 shows the tool-holder alone, seen from the side shown in Fig. 5.

Fig. 7 is a side view of the tool.

Fig. 8 is a cross-section of the tool.

Fig. 9 is a front view of Fig. 5, and

Fig. 10 is a section on the line A—B of Fig. 2, with the tool removed from the holder.

Fig. 11 is a section at right angles to the cutting edge.

In order that the analogy between my novel tool and the usual type of tool may readily be understood, I have illustrated this usual type in Fig. 1, in which the angle $h$ is the angle of rake, sometimes called the "backing off angle." The angle $g$ is designated as the "cutting angle or clearance angle" and the angle $f$ is the "lip angle," and in some instances in lathe tools is zero.

The lip angle varies according to the kind of material to be cut, to permit a free and ready discharge of the chips. In order to give a lathe tool a lip, or to change the lip, the temper is drawn and the point forged to shape, according to requirements, re-tempered, and ground or dressed. By varying the inclination of the tool from a horizontal, the angles $g$ and $h$ are inversely varied within small limits, the lip angle $f$ remaining constant. This angle may also be varied by grinding back the tool to vary the angle $g$.

In metal lathes the tools are usually held in horizontal position, but with softer materials, as wood, fiber and the like, they are held at any suitable angle to apply the cutting edge above the horizontal axis of the work. If held below the horizontal axis of the work the tool will chatter.

My invention has for its object to provide a round spiral tool whose groove is of such contour that the lip is permanent and coextensive in length with the spiral groove in the tool, and the tool itself is so flat that there will be no obstruction to the discharge of chips. The effect of such a structure is that it is only necessary to grind or dress the tool to sharpen it, the sharpening simultaneously producing the clearance angle $g$ and the cutting lip angle $f$. No other dressing is necessary throughout the length of the tool. The tool is held in a holder that is formed to coöperate therewith and permit the clearing of the chips.

This holder H consists of an upper shell or casing 11, and a lower shell or casing 12. On one side there is provided between these two shells a longitudinal slot 3; on the other side said two shells touch each other, or there may be provided between them a metal layer 13. The ends 15 and 16 of pins 14 are fixed to the shells, and around these pins there is provided an annular space 17 extending into both the upper shell and the lower shell. Owing to this there is obtained a spring action of the shells 11 and 12 near the slot 3. The upper shell is shorter than the lower one, and when connected the latter projects beyond the upper shell at each end. Both shells have rounded ends, and each end of the lower shell has two oppositely inclined converging faces forming a nose 5. The top face of the upper shell is shorter than the bottom face forming beveled end faces $x$ which extend around to the sides as indicated at $y$ and form substantially a continuation of that portion of the groove surface for the time being at the cutting portion of the tool.

In the bore 2 of the holder H there is fitted the tool M, which consists of a piece of round steel having a peculiarly formed helical groove 7. This helical groove may be obtained through milling or through an axial twisting of a round rod having a straight side groove. As shown in Fig. 8, the milling cutter F, which is shown in dotted lines, is set to cut a channel $a$ along the whole length of the tool and along one of the peripheral edges of the groove 7.

The lip is formed by a channel $a$ along one of the peripheral edges of the spiral groove. If one wishes to describe the form of the groove, it may be said that a curve $a$ forming the lip lies at the groove edge along the entire length of this groove, ends in a flat convex arc $b$, which terminates at the point $c$ along the other peripheral edge of the groove. This point $c$ lies nearly on the same level as the beginning $d$ of the curved compound surface $a\ b\ c$ forming the bottom of the groove, giving ample room for the chips to properly curl without being broken by a rear wall of the groove. Owing to this also the sharpened point 8 (Figs. 9 and 3) of the cutting tool is positioned eccentrically.

Because of the peculiar shape of the groove, and since the diameter of the cutting tool is small in proportion to the diameter of the cutting tools hitherto used for the same purpose, the hereinbefore described cutting tool cannot well be used alone on heavy work, i. e., it cannot be used to advantage, since it is too much weakened, but the peculiar shape of the tool holder H permits, (as will be best understood by reference to Figs. 2 and 5) the tool to be fitted into the tool holder in such a manner that it projects only a small amount beyond said holder.

The dotted lines 18 in Fig. 5, show how the hitherto-used tool holders have been shaped, and in such holders the cutting tool M' must project a too great amount beyond the holder, as is indicated in Fig. 5 by dotted lines. In this case the cross-section 19—20 takes up the cutting pressure of the work piece.

In the tool-holder according to my invention the cross-section 21—22 corresponding in size to the cross-section 19—20 is, however, artificially increased through the cross-section of the lower shell 23—23 to the overall cross-section 21—23, supporting the tool to its very end, so that this cutting tool together with the holder is capable of cutting off very heavy cuttings. Owing to the large free cross-section of the spiral groove 7 and the setting back or shortening of the upper shell of the tool holder, this cutting tool is capable, as will be seen by reference to Fig. 3, of removing large cuttings S laterally through the spiral groove without choking of the cuttings taking place, the chips passing along the portion of the groove exposed beyond the upper shell 11. The concave portion $a$ along one edge of the spiral groove 7, affects or controls the direction of travel of the chip along the groove 7. It will also be noted that the cutting edge is not a straight line.

The fact that the groove $a$ is cut along the whole length of the tool renders it possible to re-grind the tool in a simple manner, and to dispense with the re-forging and the grinding of special lip surfaces. The forming of the lip along the groove 7 permits of the further advantage that the inclination angle or rake, which, as is well known, has to be chosen in accordance with the hardness of the material to be worked, may be produced by an axial rotation of the cutting tool clamped in a loose manner in the holder H. To this end there is provided in the rear end of the cutting tool a slot 24 for inserting a screw-driver for turning the frictionally held tool on its axis. By reason of the form of the groove along the tool, the cutting edge is more to the side of the tool, so that the tool cuts more with the side along the edge of the groove than with the end of the tool.

The helical groove 7 may be right-handed or left-handed. The holder H may be used upon a turning at the right as well as at the left. The depth of the groove 7 may be equal to or greater than the depth of the groove of an ordinary twist drill.

It will thus be seen that the tool requires only sharpening, to renew the cutting edge. The lip does not have to be forged or ground on it. It will also be seen that the groove presents substantially a flat surface opposite the cutting edge, hence differs in this respect from the known types of such tools by omitting an upstanding wall on the side of the groove opposite the cutting edge, so that the groove will automatically clear itself of either large or small chips.

The holder and tool accurately coöperate in the discharge of chips, while simultaneously supporting the tool to its very end.

The tool has two beveled end faces intersecting one another and forming the point 8 at the cutting edge.

I claim—

1. In a device for turning and planing metal, wood and the like, a round cutting tool having a spiral groove provided at one of its peripheral edges with a channel which forms a fixed and permanent lip, a toolholder coöperating with said tool and consisting of two resilient shells, one of said shells being shorter than the other and having a curved, beveled end coöperating with said groove.

2. In a device for turning and planing metal, wood and the like, a round cutting tool having a spiral groove provided along one of its peripheral edges with a channel which forms a fixed and permanent lip, and a tool holder consisting of two resilient shells, the upper of these two shells being shorter than the lower one and both of said shells having curved, beveled ends and sides whereby the chip from said tool may continue along said sides and ends adjacent said groove.

3. In a device for turning and planing metal, wood and the like, a round cutting tool having a spiral groove provided at one of its peripheral edges with a channel which forms a lip co-extensive in length with said groove, and a tool holder consisting of two resilient shells of different length having curved beveled ends, said shells being separated at one side by a longitudinal slot and connected at the other side by means of pins the ends of which are fixed to the two shells, said pins being partly surrounded by annular spaces.

In testimony that I claim the foregoing as my invention, I have signed my name in presence of two subscribing witnesses.

HERMANN KUHN.

Witnesses:
ARNOLD LEHNER,
M. C. PIERCE.

Copies of this patent may be obtained for five cents each, by addressing the "Commissioner of Patents, Washington, D. C."